United States Patent [19]
Bos et al.

[11] Patent Number: 6,128,436
[45] Date of Patent: Oct. 3, 2000

[54] SPEED MONITORING AND CONTROL FOR A BRUSHLESS MOTOR

[75] Inventors: Edward Albert Bos, Ann Arbor; Robert Duane Gaston, Dearborn Heights, both of Mich.

[73] Assignee: Visteon Global Technologies, Inc., Dearborn, Mich.

[21] Appl. No.: 09/128,599

[22] Filed: Aug. 3, 1998

[51] Int. Cl.[7] .................................................. H02P 7/00
[52] U.S. Cl. ............................................ 388/815; 312/439
[58] Field of Search ..................................... 318/254, 435, 318/132; 388/815, 811, 819, 820, 928.1

[56] References Cited

U.S. PATENT DOCUMENTS

| | | | |
|---|---|---|---|
| 4,495,450 | 1/1985 | Tokizaki et al. ......................... | 318/138 |
| 4,743,815 | 5/1988 | Gee et al. ................................ | 318/254 |
| 4,818,908 | 4/1989 | Tamae et al. . | |
| 4,928,043 | 5/1990 | Plunkett .................................. | 318/254 |
| 5,053,664 | 10/1991 | Kikuta et al. . | |
| 5,339,013 | 8/1994 | Nakai et al. ............................. | 318/254 |
| 5,382,889 | 1/1995 | Peters et al. . | |
| 5,435,156 | 7/1995 | Sando et al. . | |
| 5,481,166 | 1/1996 | Moreira . | |
| 5,663,618 | 9/1997 | Adachi et al. ........................... | 318/254 |
| 5,761,375 | 6/1998 | Naito ....................................... | 388/806 |
| 5,915,070 | 6/1999 | Takekawa et al. ...................... | 388/811 |
| 5,923,134 | 6/1999 | Takekawa ............................... | 318/254 |

FOREIGN PATENT DOCUMENTS

0748038 A2  11/1996  European Pat. Off. .

*Primary Examiner*—Jonathan Salata
*Attorney, Agent, or Firm*—Rhonda L. McCoy-Pfau

[57] ABSTRACT

A speed monitoring and control method for a brushless motor controlled by a controller which provides switching control signals to a plurality of switching elements includes comparing one line voltage of the motor with a signal representing a voltage at the neutral node of the motor, to generate a comparison signal. The method also includes ANDing the comparison signal with a switching control signal to generate a composite feedback signal representative of a rotational speed of the motor's rotor relative to a speed of a rotating magnetic field generated by the stator.

11 Claims, 3 Drawing Sheets

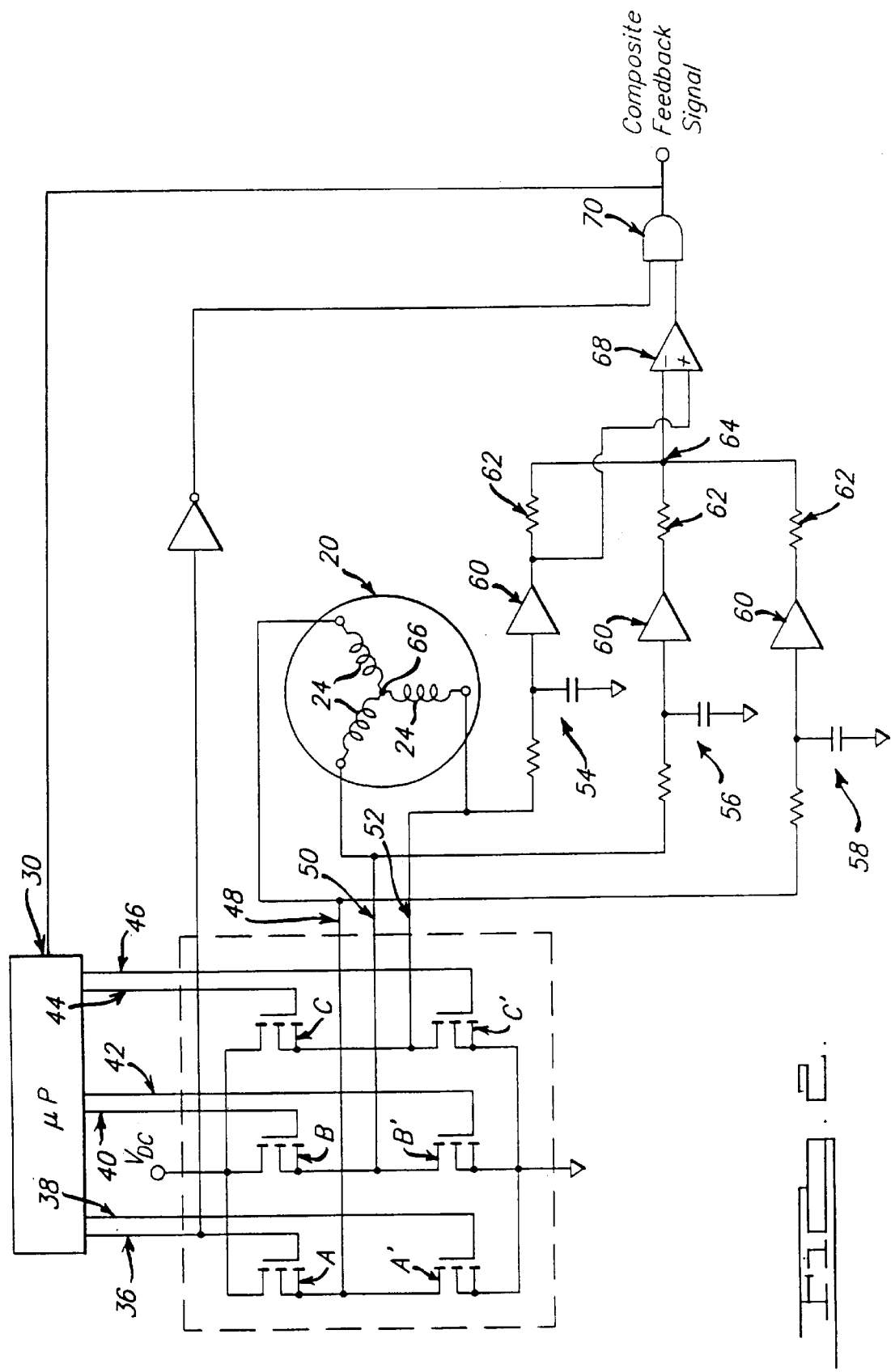

SPEED MONITORING AND CONTROL FOR A BRUSHLESS MOTOR

BACKGROUND OF THE INVENTION

1. Field of the Invention

The present invention relates to the control of brushless C motors.

2. Description of the Related Art

In control of a brushless DC motor, a controller generates appropriate signals in the stator windings of the motor to create magnetic flux which interacts with permanent magnets in the rotor. The controller typically has direct control of switching devices in an inverter, the three outputs of which (in the case of a three-phase stator) are provided to the stator windings.

In order for the controller to generate its signals in synchronism with the rotation of the rotor (and thereby maintain the "commutation" which the controller attains), knowing the speed and/or position of the rotor relative to the rotating magnetic field generated by the stator windings is important. Certainly, a sensor dedicated to sensing rotor position and/or spied will suffice. However, such a sensor adds cost and unreliability.

In another known design, a virtual "neutral" of the stator windings is created by tying the three line voltage signals of the stator together through buffer resistances. The signal at the virtual neutral is compared with the three line voltage signals. The resulting three comparison signals are useful in determining rotor position and speed However, the signals must be tracked in a computationally-intensive manner. The generation of three comparison signals and the computationally-intensive nature of tracking the signals are relatively expensive to implement.

Therefore, a way to track relative rotor speed in a more economical manner will provide advantages over the prior art.

SUMMARY OF THE INVENTION

The present invention provides a speed monitoring and control method for a brushless motor, the motor controlled by a controller which provides switching control signals to a plurality of switching elements. The method comprises comparing one line voltage of the motor with a signal representing a voltage at the neutral node of the motor, to generate a comparison signal. The method further includes ANDing the comparison signal with a switching control signal to generate a composite feedback signal representative of a rotational speed of the rotor of the motor relative to a speed of a rotating magnetic field generated by the stator of the motor.

The present invention further provides a speed monitoring and control apparatus for a brushless motor. The apparatus comprises a controller coupled to a plurality of switching elements and adapted to provide switching control signals to the switching elements to generate line voltages for the stator of the motor. The apparatus also includes an electrical node representing the neutral node of the stator. Additionally, the apparatus comprises comparison means coupled to compare a voltage at the electrical node with a line voltage of the motor to generate a comparison signal. Further, the apparatus comprises ANDing means for ANDing the comparison signal with a switching control signal to generate a feedback signal having a characteristic representative of a rotational speed of the rotor relative to a rotational speed of a rotating magnetic field generated by the stator.

In another embodiment, the present invention provides a speed monitoring and control apparatus for a brushless motor. The apparatus comprises an electrical node representing the neutral node of the stator coils of the motor. The apparatus also includes comparison means coupled to compare a voltage at the electrical node with a line voltage of said motor to generate a comparison signal. Further, the apparatus comprises means for generating a signal having a pulse width representative of a rotational speed of the rotor of the motor relative to a rotational speed of a magnetic field generated by the stator.

BRIEF DESCRIPTION OF THE DRAWINGS

FIG. 2 schematically illustrates the circuitry used in this embodiment of the present invention to monitor and control the speed of motor 20.

DETAILED DESCRIPTION OF THE PREFERRED EMBODIMENT

Figure 1:
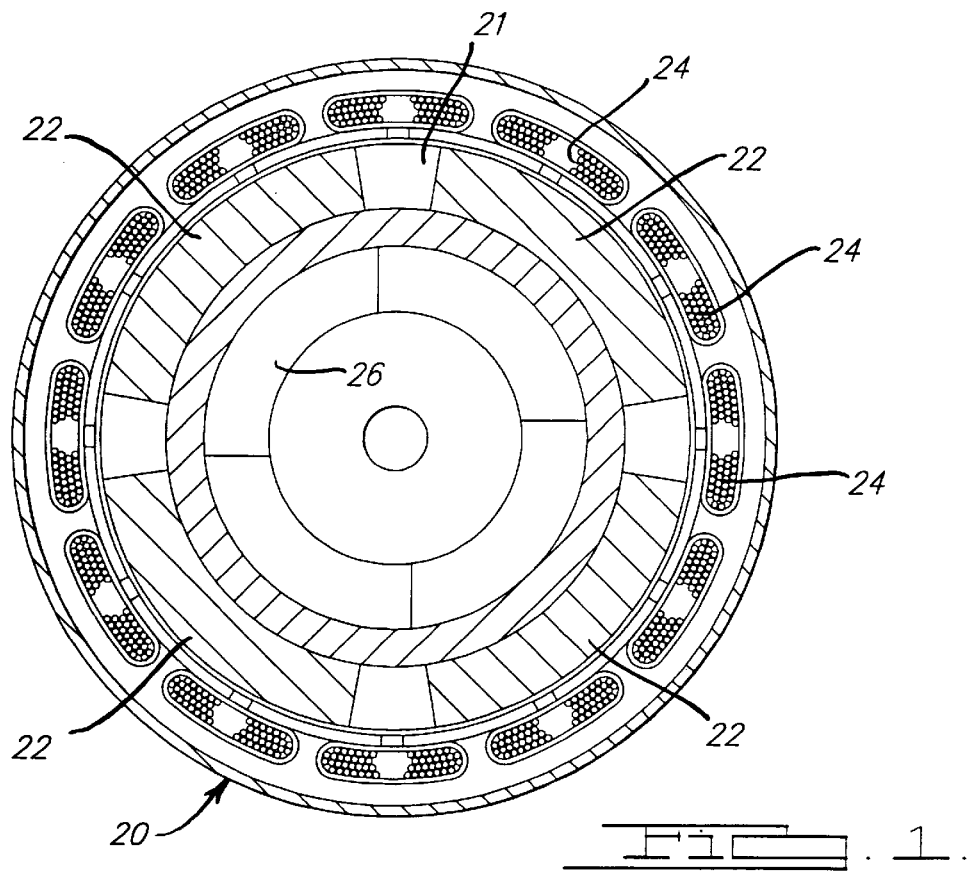
FIG. 1 is a cross-sectional view of a permanent magnet DC brushless motor 20 according to one embodiment of the present invention.

Refer first to FIG. 1, where a cross-section of a permanent magnet brushless motor 20 is shown. Motor 20 includes a rotor 21 having permanent magnets 22. Motor 20 also includes stator windings 24. As will be seen below, stator windings 24 in this embodiment of the present invention are three-phase windings connected in a WYE configuration.

In this embodiment of the present invention, motor 20 is a fuel pump motor. The fuel pump has a helical impeller 26 running axially through rotor 21. Although not necessary to understand the present invention, more detail of the helical impeller design is disclosed in co-pending U.S. patent application Ser. No. 09/055,427, filed Apr. 6, 1998. The entire disclosure of that application is hereby incorporated by reference.

Refer now additionally to FIG. 2. A microprocessor 30 controls the switching elements A, A', B, B', C and C' of an inverter 34 via six circuits 36, 38, 40, 42, 44 and 46. The switching elements may be field-effect transistors, as shown, bipolar transistors or other suitable switching devices. The outputs 48, 50 and 52 of inverter 34 are provided to stator windings 24 of motor 20.

Figure 3:
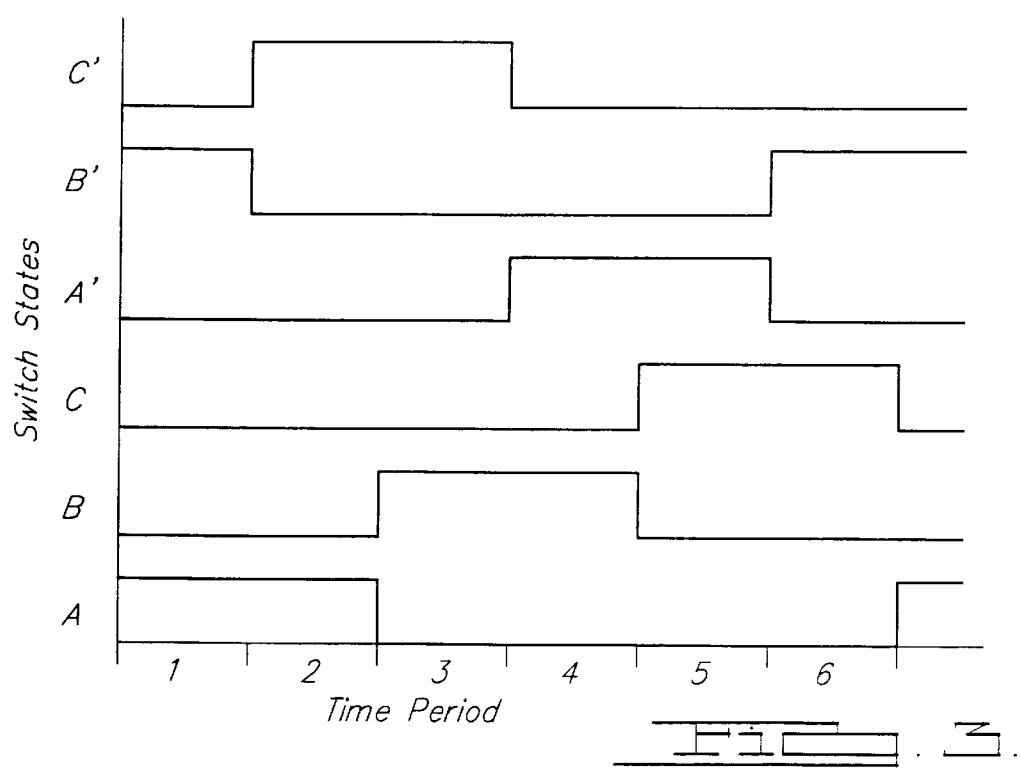
FIG. 3 illustrates the control signals generated by microprocessor 30 of FIG. 2 in order to control the "commutation" of motor 20.

Microprocessor 30 generates signals as illustrated in FIG. 3 in order to control motor 20. Microprocessor 30 repetitively acts as a "state machine" by controlling the states of switching elements A, A', B, B', C and C' as shown in FIG. 3. For example, at time period 2 as measured on the horizontal axis of FIG. 3, switches A and C' are ON and the remainder of the switching elements are OFF.

Microprocessor 30 needs to know the speed of rotor 21 of motor 20, at least relative to the speed of the rotating magnetic field generated by switching elements A, A', B, B', C and C' in stator windings 24. If the speed of rotation of rotor 21 slips too far relative to the speed of the rotating magnetic field, the generation of switching signals by microprocessor 30 will fall too far out of synchronization with rotor 21. The motor will "lose commutation" and stall.

With reference once again to FIG. 2, the circuitry used to sense the speed of rotor 21 relative to the rotating magnetic field will now be described. Outputs 48, 50 and 52 of inverter 34 (the "line voltages" of motor 20) are each filtered by low-pass filters 54, 56 and 58, respectively, and buffered and isolated by buffers 60 and resistors 62. The resulting signal at node 64 is a virtual representation of the voltage at neutral 66 of stator windings 24. This signal is compared at comparator 68 with the filtered line voltage from output 48 of inverter 34. Because the back electromotive force ("back emf") generated by rotation of permanent magnet rotor 21 is reflected in the line voltage signals, the output of comparator 68 contains information regarding the position of rotor 21 with respect to the rotating magnetic field generated by stator windings 24. However, this signal has not heretofore been useful without three such comparison signals (from all three line voltages with respect to the virtual neutral) and much computational effort to track the rotor position with respect to the rotating stator field.

In this embodiment of the present invention, however, the output of comparator 68 is ANDed by AND gate 70 with the inverted switching signal for switching element A in inverter 34. The resulting "composite feedback signal" is a pulse train having a pulse width proportional to rotor 21's lag in speed behind the speed of the rotating stator field. When this signal is fed back to microprocessor 30, the rate of repetition of the states in the "state machine" illustrated in FIG. 3 can be adjusted to assure that the rotating magnetic field's rotational speed is maintained in a reasonable range relative to the speed of rotor 21.

Figure 4:
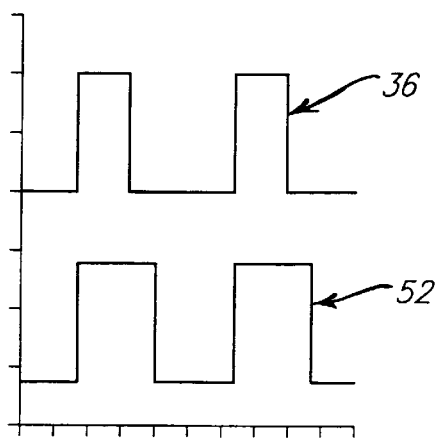
FIGS. 4 through 8 graphically illustrate signals at various points in the circuitry of FIG. 2.
Figure 5:
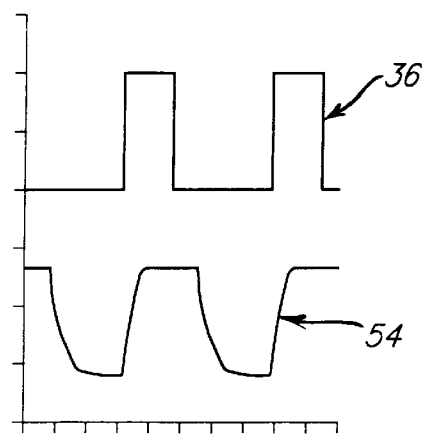
Figure 6:
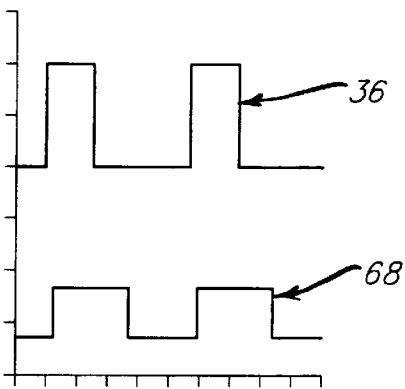
Figure 7:
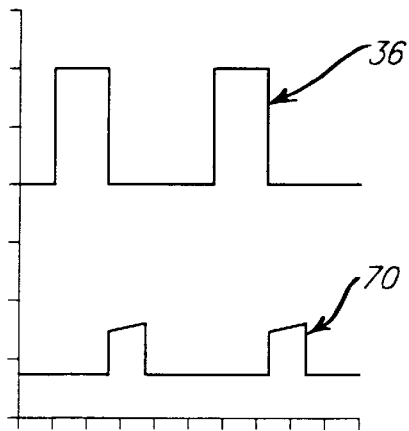
Figure 8:
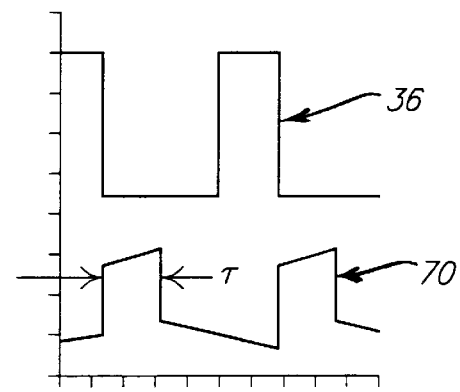

Graphical representations of several signals useful in understanding the discussion herein are presented as FIGS. 4 through 8. The upper signal of each of these figures is the control signal generated by microprocessor 30 for switching element A. In FIG. 4, the lower signal is the line voltage at output 52 of inverter 34. In FIG. 5, the lower signal is the filtered line voltage at the output of low-pass filter 54. In FIG. 6, the lower signal is the output of comparator 68. In FIG. 7, the lower signal is the "composite feedback signal" with rotor 21 in a relatively low state of slip with respect to the rotating magnetic field generated by stator windings 24. Finally, in FIG. 8 the lower signal is the "composite feedback signal" with rotor 21 in a higher state of slip than in FIG. 7. The increased pulse width X of the composite feedback signal in FIG. 8 reflects the higher state of slip.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A speed monitoring and control method for a brushless motor, said motor having a rotor and a stator, said stator having a plurality of coils connected with a neutral node, said stator further coupled to a plurality of line voltages, said motor controlled by a controller which provides switching control signals to a plurality of switching elements, said method comprising:

comparing one said line voltage with a signal representing a voltage at said neutral node, to generate a comparison signal; and ANDing said comparison signal with a said switching control signal to generate a composite feedback signal representative of a rotational speed of said rotor relative to a speed of a rotating magnetic field generated by said stator.

2. A speed monitoring and control method as recited in claim 1, further comprising:

filtering all said line voltages to generate filtered line voltage signals; and combining said signals to generate said signal representing a neutral voltage of said motor.

3. A speed monitoring and control method as recited in claim 1, further comprising:

modifying said speed of said rotating magnetic field in view of said relative speed of said rotor.

4. A speed monitoring and control method as recited in claim 1, wherein said step of ANDing said comparison signal with one said switching control signal to generate a composite feedback signal representative of a speed of said rotor relative to a speed of a rotating magnetic field generated by said stator further comprises:

ANDing said comparison signal with one said switching control signal to generate a composite feedback signal having a pulse-width representative of a speed of said rotor relative to a speed of a rotating magnetic field generated by said stator.

5. A speed monitoring and control apparatus for a brushless motor, said motor having a rotor and a stator, said stator having a plurality of coils connected with a neutral node, said apparatus comprising:

a controller coupled to a plurality of switching elements and adapted to provide switching control signals to said switching elements to generate line voltages for said stator;

an electrical node representing said neutral node;

comparison means coupled to compare a voltage at said electrical node with a said line voltage of said motor to generate a comparison signal:

ANDing means for ANDing said comparison signal with a said switching control signal to generate a feedback signal having a characteristic representative of a rotational speed of said rotor relative to a rotational speed of a rotating magnetic field generated by said stator.

6. A speed monitoring and control apparatus for a brushless motor as recited in claim 5, wherein said characteristic is a pulse-width of said feedback signal.

7. A speed monitoring and control apparatus as recited in claim 5, wherein said ANDing means comprises an AND gate and said comparison means comprises a comparator.

8. A speed monitoring and control apparatus as recited in claim 5, further comprising:

a plurality of low-pass filters each coupled to filter a respective one of said line voltages, said low-pass filters having outputs coupled together at said electrical node representing a neutral of said stator.

9. A speed monitoring and control apparatus as recited in claim 5, further comprising means for modifying said rotational speed of said magnetic field generated by said stator in view of said relative speed of said rotor.

10. A speed monitoring and control apparatus for a brushless motor, said motor having a rotor and a stator, said stator having a plurality of coils connected with a neutral node said apparatus comprising:

an electrical node representing said neutral node;

comparison means coupled to compare a voltage at said electrical node with a said line voltage of said motor to generate a comparison signal; and means for generating a signal having a pulse width representative of a rotational speed of said rotor relative to a rotational speed of a magnetic field generated by said stator.

11. A speed monitoring and control apparatus as recited in claim 10, further comprising means for modifying said speed of said magnetic field in light of said relative speed of said rotor.

* * * * *